(12) United States Patent
Stanley

(10) Patent No.: US 11,568,773 B2
(45) Date of Patent: Jan. 31, 2023

(54) DISPLAYING DEVICE

(71) Applicant: James Calvin Stanley, Visalia, CA (US)

(72) Inventor: James Calvin Stanley, Visalia, CA (US)

( * ) Notice: Subject to any disclaimer, the term of this patent is extended or adjusted under 35 U.S.C. 154(b) by 0 days.

(21) Appl. No.: 15/707,841

(22) Filed: Sep. 18, 2017

(65) Prior Publication Data
US 2018/0082613 A1    Mar. 22, 2018

Related U.S. Application Data

(60) Provisional application No. 62/395,659, filed on Sep. 16, 2016.

(51) Int. Cl.
| B60R 11/02 | (2006.01) |
| G09F 21/04 | (2006.01) |
| G09F 7/18 | (2006.01) |
| B60R 7/06 | (2006.01) |

(52) U.S. Cl.
CPC ............... *G09F 21/04* (2013.01); *B60R 7/06* (2013.01); *B60R 11/02* (2013.01); *B60R 11/0241* (2013.01); *G09F 7/18* (2013.01)

(58) Field of Classification Search
CPC ............... Y10T 403/7039; B60R 11/02; B60R 11/0241; B60R 7/06; B60R 2011/0071; B60R 2011/0005; H04M 1/04; H04M 1/11; H04M 1/6075; H04M 17/026
USPC .......................................... 40/593; D14/447
See application file for complete search history.

(56) References Cited

U.S. PATENT DOCUMENTS

| 2,969,605 | A | * | 1/1961 | Garvin | B60R 7/08 40/600 |
| 4,132,022 | A | * | 1/1979 | Wood, Jr. | G09F 19/06 40/5 |
| 5,677,701 | A | * | 10/1997 | Okuyama | B60K 37/02 345/7 |
| 5,680,719 | A | * | 10/1997 | Poser | G09F 7/12 40/450 |
| 5,860,573 | A | * | 1/1999 | Hossack | B60R 7/14 211/89.01 |
| 6,197,390 | B1 | * | 3/2001 | LaVite | B60R 13/005 343/720 |
| 7,389,602 | B1 | * | 6/2008 | Simoes | G09F 1/00 40/593 |
| 7,834,752 | B2 | * | 11/2010 | Kuvantrarai | B60Q 1/44 340/468 |
| 8,998,049 | B1 | * | 4/2015 | Orr | B60R 11/02 224/567 |
| 9,266,474 | B2 | * | 2/2016 | DeWard | B60R 11/04 |
| 9,682,661 | B1 | * | 6/2017 | Pernici | B60R 11/00 |
| D816,027 | S | * | 4/2018 | Chen | D13/108 |
| 11,203,306 | B2 | * | 12/2021 | Hodge | B60R 11/04 |

(Continued)

*Primary Examiner* — Cassandra Davis
(74) *Attorney, Agent, or Firm* — Robert Z. Evora, Esq.

(57) ABSTRACT

A display device having a wedge shape body for displaying indicia on a dashboard of a vehicle between a windshield and a dashboard. The wedge shape body having a front surface, a lower surface, a rear surface and a pair of sides. The front surface includes indicia displayed thereon. The lower surface of the wedge shape body is a gripping surface that prevents slippage of the display device. Various items can be secured to the rear surface of the display device, such as a mobile device holder, a deodorant and the like.

14 Claims, 14 Drawing Sheets

(56) References Cited

U.S. PATENT DOCUMENTS

| | | | | |
|---|---|---|---|---|
| 2009/0108169 A1* | 4/2009 | Gough | B60R 11/02 | 248/615 |
| 2009/0159766 A1* | 6/2009 | Lawson | B60R 11/02 | 248/231.9 |
| 2011/0107634 A1* | 5/2011 | Kabalka | G09F 3/203 | 40/606.01 |
| 2011/0154705 A1* | 6/2011 | Gardiner | G09F 3/203 | 40/643 |
| 2011/0287665 A1* | 11/2011 | Chien | F21S 8/035 | 439/638 |
| 2012/0199621 A1* | 8/2012 | Yoon | B60R 11/02 | 224/483 |
| 2013/0058023 A1* | 3/2013 | Supran | H05K 7/00 | 361/679.01 |
| 2013/0266367 A1* | 10/2013 | Winklbauer | B60R 13/02 | 403/361 |
| 2014/0037867 A1* | 2/2014 | Wheatley | B60R 7/08 | 428/29 |
| 2014/0325818 A1* | 11/2014 | Mayfield | F16M 11/041 | 206/524.1 |
| 2014/0361130 A1* | 12/2014 | Fenton | F16M 11/041 | 248/176.1 |
| 2015/0068082 A1* | 3/2015 | Stanley | G09F 21/04 | 40/597 |
| 2015/0223353 A1* | 8/2015 | Reinauer | F16M 13/00 | 248/176.1 |
| 2017/0123203 A1* | 5/2017 | Klabukov | G02B 27/0101 | |
| 2018/0111568 A1* | 4/2018 | Guirao Cartagena | H04M 1/04 | |
| 2019/0277441 A1* | 9/2019 | Maratas | H04M 1/04 | |

* cited by examiner

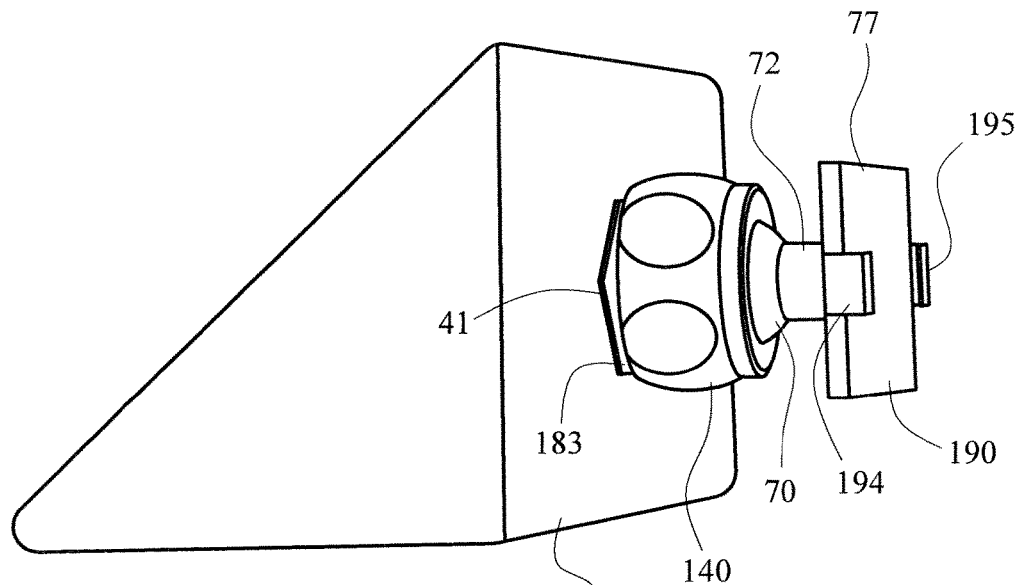
FIG. 15
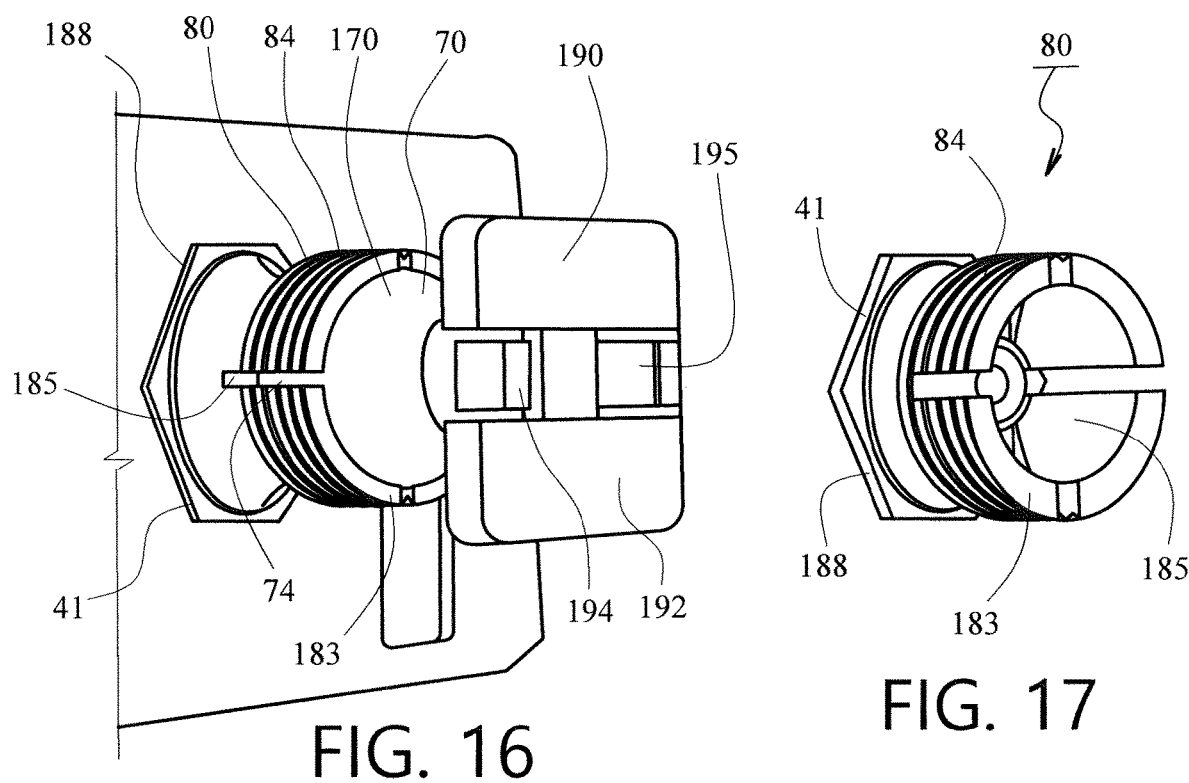
FIG. 16
FIG. 17

DISPLAYING DEVICE

CROSS REFERENCE TO RELATED APPLICATION

This application is a Non-Provisional Application which claims the benefit of the filing date of: U.S. Provisional Application Ser. No. 62/395,659 filed Sep. 16, 2016, the entirety of both applications which is incorporated herein by reference.

BACKGROUND

1. Field

This invention relates in general to providing a display device, and in particular to providing a display device on a dashboard of a vehicle for use under a windshield or between a rear windshield and a rear deck of a vehicle.

2. Description of the Related Art

Conventionally, decals having indicia are placed as flags outside of a vehicle attached to the frame of a window and/or in the corner of a vehicle window so as to prevent the illegal obstruction of a drivers view. The indicia may include a favorite school, motto, vocal band, a professional athletic team, a branch of military, a mascot, a brand, a logo or any other type of desired label displayed by the owner of the vehicle.

SUMMARY

An object of this subject disclosure is to provide a display device on a dashboard of a vehicle between a windshield and a dashboard, or between a rear windshield and a rear deck of a vehicle.

In particular, the display device has a wedge shape body for displaying indicia on a dashboard of a vehicle between a windshield and a dashboard or a rear deck. The wedge shape body having a front surface, a lower surface, a rear surface and a pair of sides. The front surface includes indicia displayed thereon. The lower surface of the wedge shape body is a gripping surface that prevents slippage of the display device. The rear surface of the wedge shape body has an interchangeable retaining member adapted to receive and secure various attachments to the display device.

The display device may also be designed to include a power source, an illumination source, such as LED's or other suitable light source to prominently display the indicia and various other features.

These and other objects, features, and/or advantages may accrue from various aspects of embodiments of the present invention, as described in more detail below.

BRIEF DESCRIPTION OF THE DRAWINGS

Various exemplary embodiments of this invention will be described in detail, wherein like reference numerals refer to identical or similar components or steps, with reference to the following figures.

FIG. 15 is a rear perspective view of the retaining member and the mating interchangeable attachment embodied as a mobile device holder.

FIG. 16 is an exploded rear perspective view of the retaining member and the mating interchangeable attachment embodied as a mobile device holder.

FIG. 17 is an exploded rear perspective view of the retaining member.

DETAILED DESCRIPTION OF EXEMPLARY EMBODIMENTS

Particular embodiments of the present invention will now be described in greater detail with reference to the display device shown in the attached figures.

Figure 1:
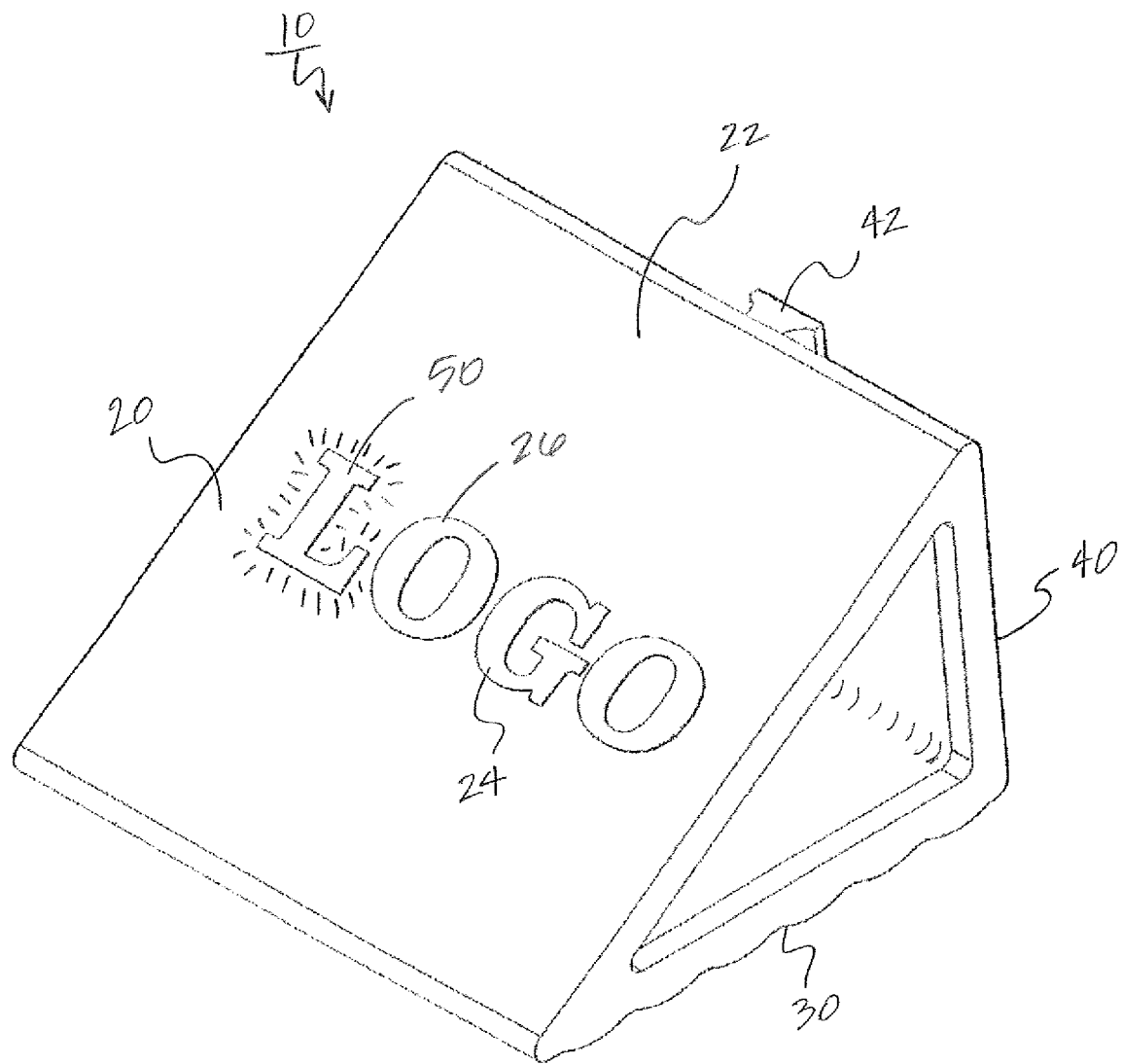
FIG. 1 is a front perspective view of the display device according to this subject disclosure.
Figure 2:
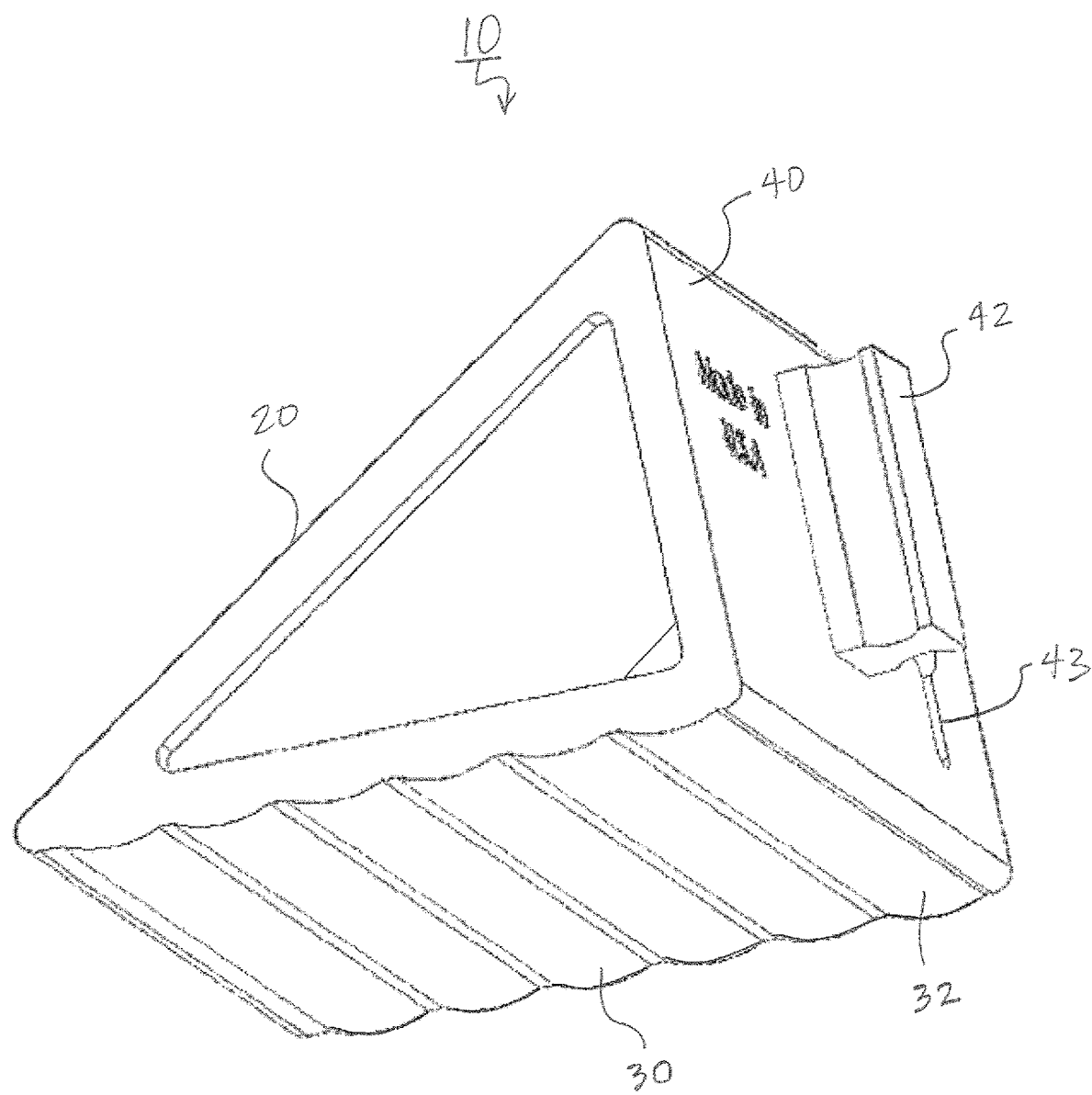
FIG. 2 is a side perspective view of the display device.
Figure 3:
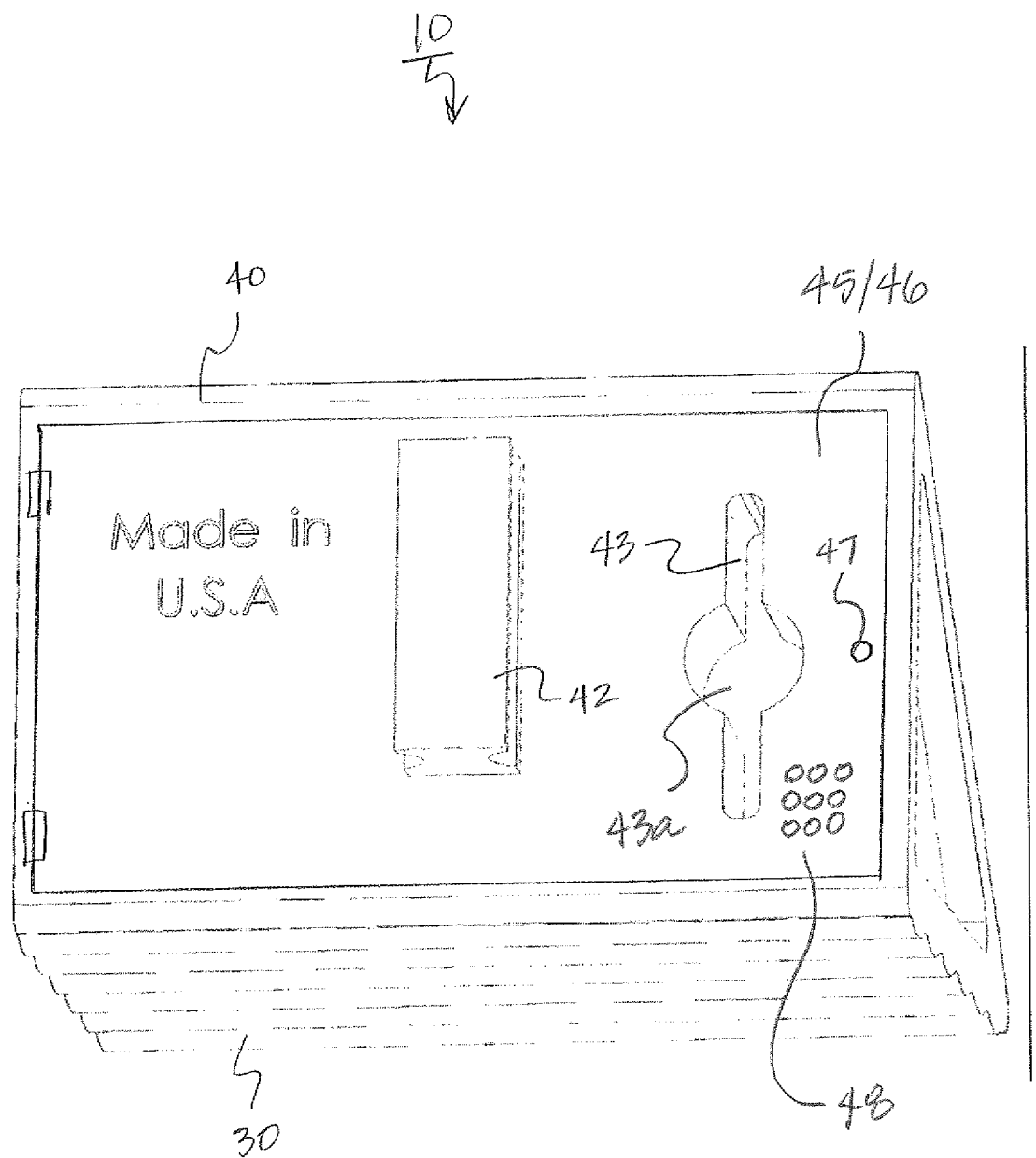
FIG. 3 is a rear perspective view of the display device.
Figure 7:
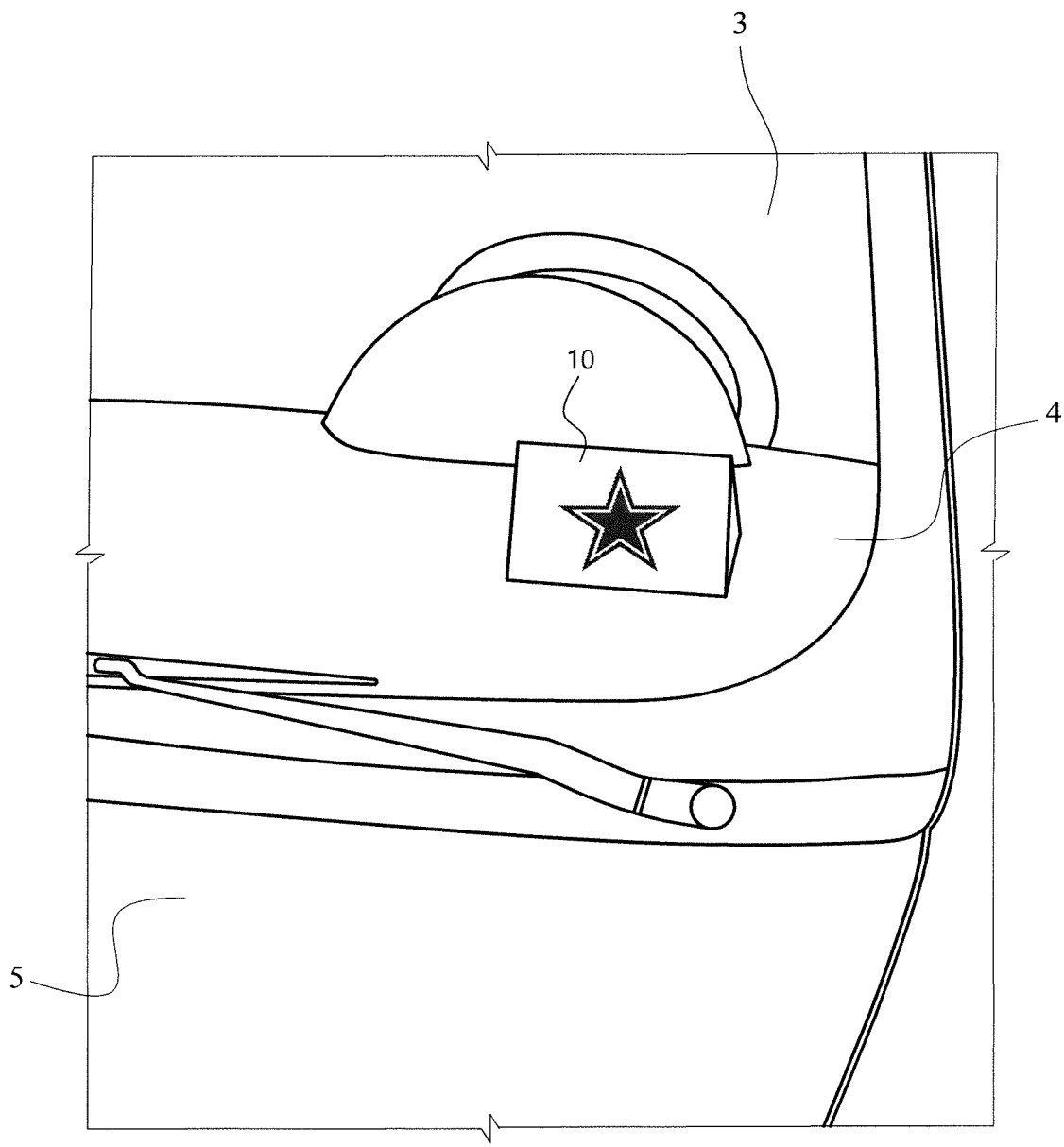
FIG. 7 shows a perspective view of the display device positioned between a front windshield and a dashboard.

FIGS. 1-3 illustrate perspective top, side and rear views of a display device 10. The display device 10 is constructed in a wedge shape body design having a front surface 20, a lower surface 30, a pair of side surfaces 25 and a rear surface 40. The wedge shape body is adapted to fit within a space between a front windshield 3 and a dashboard 4 (such as shown in FIG. 7), or the space directly below the rear windshield and a rear deck of a vehicle 5.

Figure 12:
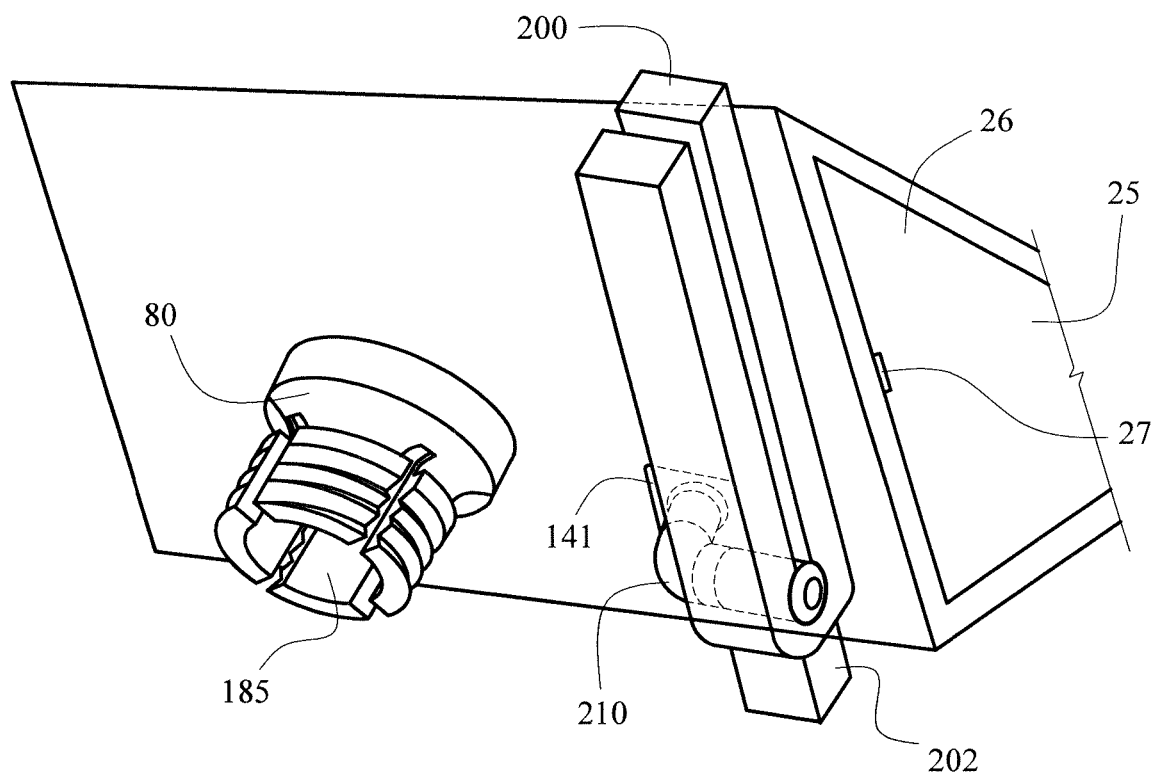
FIG. 12 is a rear perspective view of the retaining member and the second retaining member securing a deodorizing element.

The wedge shape body of the display device 10 may be open (as shown in FIGS. 1-2 and 19-20) or closed (as shown in FIG. 12). Referring to FIG. 12, when closed, a side door 26 may be removably secured to the side of the wedge body. The side door 26 may include a flange 27 adapted to be pressed against to release the friction fit of the side door 26 against the wedge shape body of the display device 10.

The lower surface 30 of the wedge shape body may be constructed to increase the friction in the narrow space to prevent movement of the display device 10. The lower surface 30 may be made of, or include a material having a substantial coefficient of friction to act as a material grip to prevent slippage of the display device 10 from occurring between the windshield and the dashboard of the vehicle.

Figure 4:
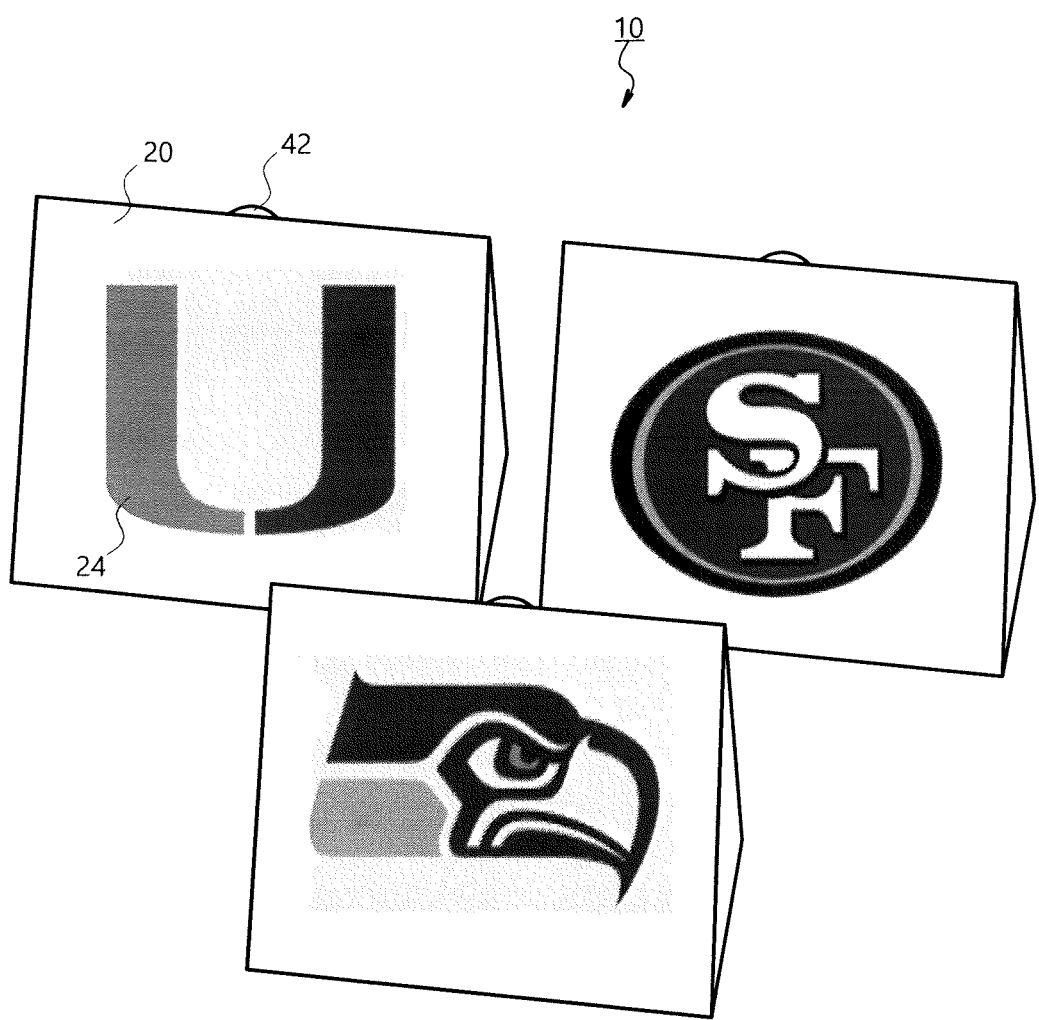
FIG. 4 is a front view of various display devices with different indicia.
Figure 5:
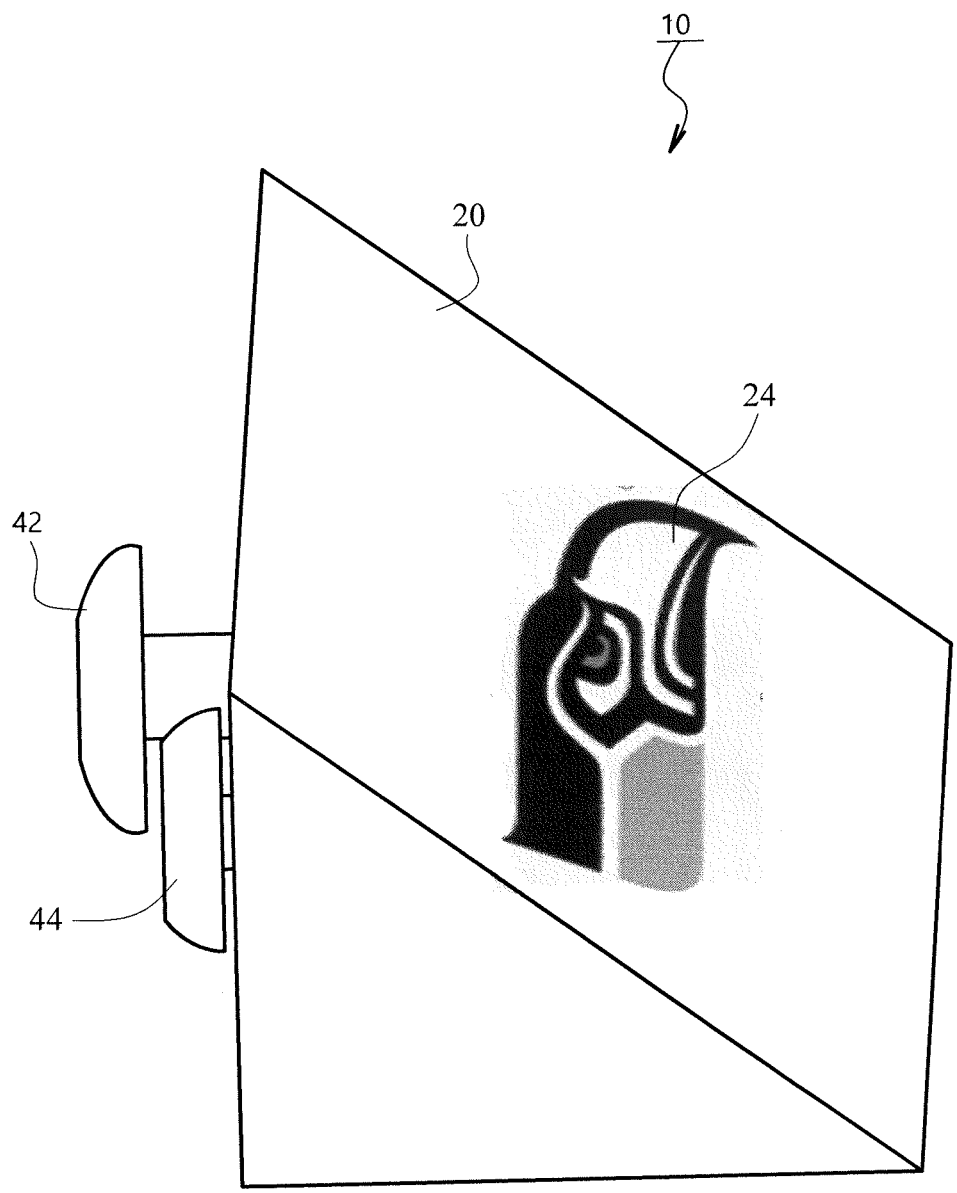
FIG. 5 is another side perspective view of the display device.

FIGS. 1, 4 and 5 show indicia provided on the front surface 20 capable of displaying various ornamental logos. The front surface 20 of the display device 10 includes a flat display panel 22. The display panel 22 may take a variety of different shapes, sizes, colors or the like as contemplated within the features and objects of this subject disclosure.

As shown, various types of indicia 24 may be displayed on the display panel 22. The indicia 24 may be composed of a variety of different shapes, colors and sizes. However, it is to be understood that any size and shape may be chosen according to this subject disclosure. The indicia 24 and/or the display panel 22 may take any desired shape, including but not limited to, circles, rectangles, squares, triangles, trademark designs, a logo, a brand, a mascot, and/or any obtuse shape, design or printed indicia in accordance with this subject disclosure. It should be understood that the entire front surface 20 may be constructed to take the shape of the ornamental logo.

Figure 6:
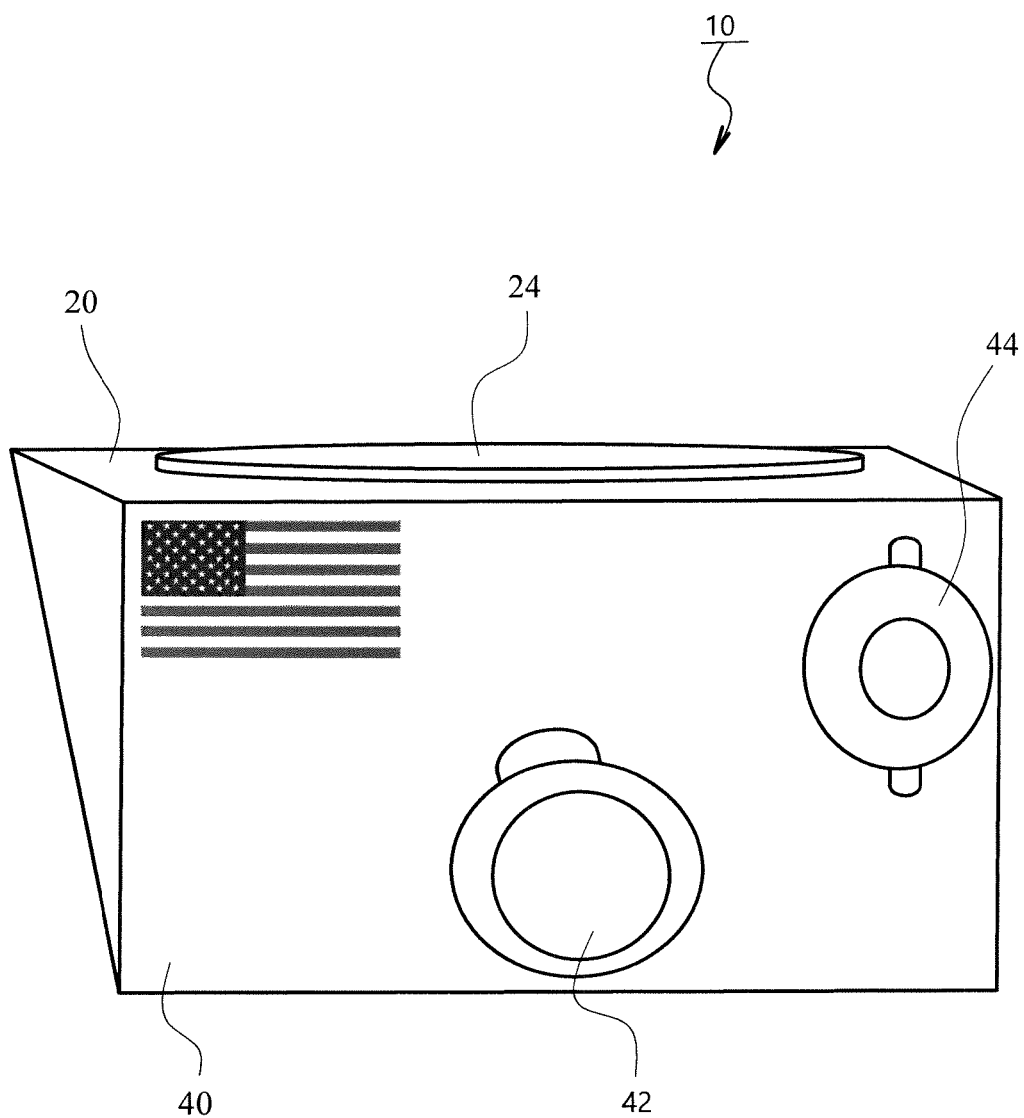
FIG. 6 is another rear perspective view of the display device.

The display panel 22 may be opaque and/or may be made of a translucent material to display the indicia 24 therethrough. The indicia 24 may be affixed onto the display panel 22 in a variety of different ways. For example, the indicia 24 may be constructed in a sold object (such as shown in FIGS. 5-6), it may be silk-screened or formed directly into the display panel 22 in any number of plausible ways now known or later developed. Alternatively, the indicia 24 may be embedded within a translucent display panel. The indicia 24 may include, for example, a trademark, a service mark, a name, an emblem, a logo, a banner, an advertisement and/or any other type of indicia. The user can place indicia 24 to support their favorite business, university, school, local establishment, military, hobbies, and the like.

The indicia 24 may be attached to display panel 22 in a variety of different ways. One method would be to provide an adhesive to the back side of the indicia 24 that lies adjacent to the display panel 22. The adhesive may be glue, a polymer, rubber, cement, a translucent adhesive, Velcro, and/or any other type of material used for providing adhesion from one surface to another within the scope of this subject disclosure.

The lower surface 30 may be made of, or include a material having a substantial coefficient of friction to act as a material grip to prevent slippage of the display device from occurring between the windshield 3 and the dashboard 4 of the vehicle or as shown in FIG. 7. Various types of material may be placed on the lower surface 30 of the display device 10, such as but not limited to cloth, a rubber, a polymer and/or any other type of material with an elevated level of friction.

FIGS. 2-3 show the lower surface 30 may be constructed to include various friction inducing textures. FIG. 2 shows a slightly scalloped texture 32 that adds to the friction produced when the display device 10 is sitting on top of a surface. Various other constructions are possible according to this subject disclosure.

FIGS. 3 and 5-6 depict the rear surface 40 having a handle 42 and at least one opening 43. The handle 42 is provided to assist a user with the installation and withdrawal of the display device 10 in the narrow space between the windshield 3 and the dashboard 4 of the vehicle 5. Various shapes may be selected for use as a preferred handle according to this subject disclosure.

As shown in FIG. 3, the opening 43 provided on the rear surface 40 of the display device 10 may be adapted for various uses. For example, the opening 43 may be provided to receive and secure a deodorizer or an air freshener 44 such as shown in FIG. 6. The air freshener 44 may have a body structure capable of fitting into the recessed opening 43. Various connections are possible for securing the air freshener to the display device 10.

The rear surface 40 may also be adapted with an entrance to provide ingress into an internal compartment 46 or a storage area within the display device 10. The entrance into the internal storage compartment 46 may be provided in the form of a door 45 that can be pivoted open, or slid to one side or other method for blocking and permitting entrance into the storage compartment within the display device 10. It is to be understood that the door 45 may be provided on any surface of the display device 10 in order to grant access to the internal storage compartment.

As shown in FIG. 3, a fastener 47 may be provided to secure the door closed. The fastener 47 may be selected from any number of fastening mechanisms, including but not limited to: a screw, a universal joint, a releasable locking pin, a lever, a pivot and/or any other suitable fastening mechanism desired for optimal closure and opening of the door.

A user can store a variety of different items within the storage compartment, such as sunglasses, keys, tissue, cards and/or any other item suitable item capable of being stored within the display device 10.

The wedge shape body design is adapted to fit within a space between a windshield 3 and a dashboard 4 of a vehicle 5 or a rear deck of the vehicle 5. It is to be understood that the shape of the body can take any suitable body shape capable of fitting within the space between the windshield 3 and the dashboard 4 or a rear windshield and a rear or the vehicle 5.

The display device 10 can be constructed from a variety of different materials. That is, the display device 10 can be constructed as a soft, pliable structure, a semi-rigid, rigid material construction or some blend of the like. Various materials may be used as the composition for the display device 10. For example, a metal, a polymer, a rubber, a plastic, a vinyl, cloth, a moldable material and/or any other material, now known or later discovered, may be used to make up the composition of the display device. The various components of the display device 10 may be translucent, opaque and/or any other shade, texture or color therefore.

An illumination source 50 (FIG. 1) may be provided throughout various component parts of the display device 10. The illumination source 50 can be beneficial to enhance the visibility of the indicia 24 and/or any other component part of the display device 10. An illumination circuit and source (such as a light emitting diode(s) (LED)) may be integrated within any of the various components within the display device 10.

Fiber optic elements in the display device 10 may be electrically connected through various wire conductor elements to a replaceable power source, such as a battery. Alternatively, the display device 10 itself may have solar collecting elements adapted to collect and store the solar energy stored for later use when the display device 10 is placed in a dark environment.

Various electrical connections may be made through the various component parts of the display device 10 via various conductive junctions such that each of the illumination component parts can be electrically connected closing a circuit causing each to transfer power from a power source to each of the illumination component parts of the display device 10.

The power source may be activated by a switching element such that illumination of the fiber optic elements within the display device 10 can be activated upon activation of the switching element, or performs some desired action, such as by depressing a button on the display device 10. In this embodiment, the button 26 may be a portion of the actual logo or indicia (FIG. 1).

The display device 10 may be embedded with an access element may that contains various types of information capable of providing verification, authentication and access that are currently known or later developed such as on electronic sensored toll roads or other events. For example, the access element may be a magnetic strip, a bar code, a near field technology element, an RF transponder, and/or any other method for sending and receiving information to and from a processor in an electronic control unit and the access element.

The access element may be disposed anywhere on the display device 10. The access element may be implemented for any number of various purposes. For example, at an athletic sporting event, the display device 10 with the access element may provide entry to the event or the parking lot to the event on the particular day that the event is scheduled. After the event has concluded, access to the event parking lot may be disabled and the display device 10 may be used as a display memento in support of the particular team displayed by the indicia 30 on the display device 10.

Alternatively, the display device 10 with the access element may be programmed as a season parking pass which will enable access throughout an entire sporting event season or the like. It would only then be necessary to provide one access element as a season pass and not a parking pass and an event ticket for entrance for each game day. Security personnel can verify proper access to the event by swiping a reader over the display device 10 embedded with the access element and reading and verifying proper admittance for that particular day.

In addition, if an RF transponder or near field technology element is integrated as the access element, an arm to the parking lot gate may be opened only if access for that particular day could be verified and approved by an RF receiving device attached to a processor.

Alternatively, the display device 10 can be integrated with a speaker and wireless technology to transceiver communication between a mobile device and the display device 10. For example, after the mobile device is wirelessly paired via a conventional wireless technology with the display device 10, audio from the mobile device can be transmitted from the mobile device to the speaker in the display device 10.

According to this invention, the processor may be implemented at various elements of the display device 10. The processor may be implemented in association with, and/or as part of, the various access technologies used for authenticating and granting access to the access element, and/or in association with the various elements of the display device 10. The processor may be implemented as a programmed general purpose computer, on a special purpose computer, a programmed microprocessor or micro-controller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device processor capable of providing the information necessary to provide access information can be used according to this subject disclosure.

The processor may be associated with a storage unit using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The processor of the display device 10 is programmable and can be adapted to provide instructions for access limitations to a particular area in accordance with this subject disclosure.

According to another alternative, a portion of the housing of the display device 10 may include an internal storage compartment 46 for an air freshener 44. The housing may include various perforations 48 through which the odor may escape from within the housing of the display device 10. The air freshener 44 may be used to sanitize the air, neutralize odor, or simply refresh the surrounding area of an undesirable order. The air freshener 44 may be employed with a dual purpose for eliminating the source of an odor while leaving a clean scent in its place. The air fresheners 44 may be embodied as a fragrance that permits a predetermined amount of fragrance to emanate through the various perforations 48. Alternatively, and not shown, the air freshener may be dispensed as a spray or a puff of fragrance in which a push-button mechanism integrated onto the display device 10 may cause the air freshener 44 to be dispensed through the various perforations 48.

Various types of aromatic fragrance materials may be used in combination with this invention and placed within the air freshener housing, including, but not limited to, scented, materials, waxy materials, potpourri, gels, a variety of synthetic fragrance components, such as aldehydes, ketones, esters, alcohol, terpenes, and any other fragrance that is now known or later developed in accordance with this invention. Alternatively, the display device 10 housing may be made of an air freshening material.

Various elements of the display device 10 can be made interchangeable such that a variety of different devices can be integrated into the display device 10. For example, a retaining member 80 can be integrated onto the display device 10 which is capable of removably attaching various features with the display device 10.

Figure 8:
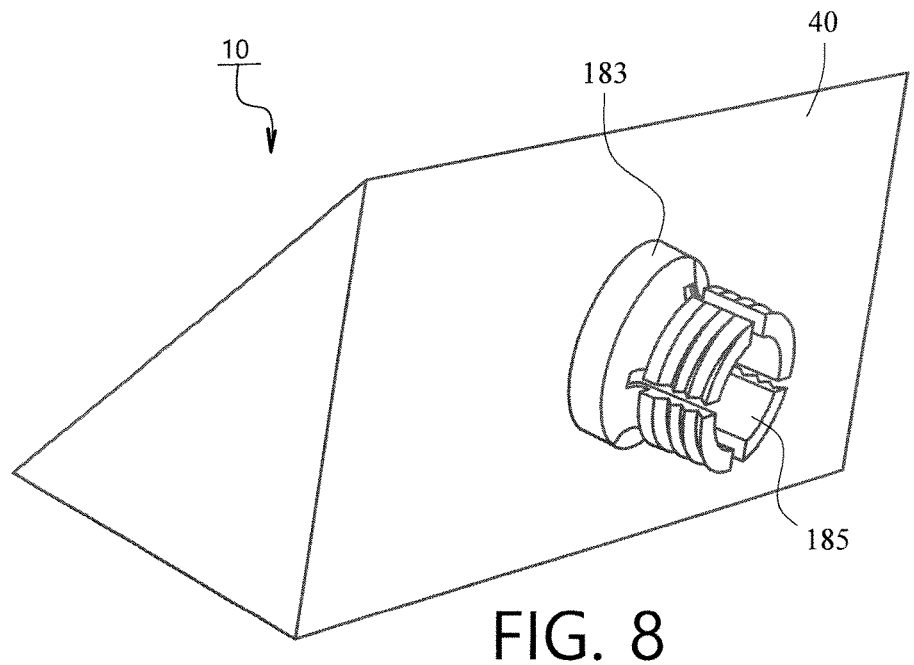
FIG. 8 is a rear perspective view of the display device depicting the retaining member.
Figure 9:
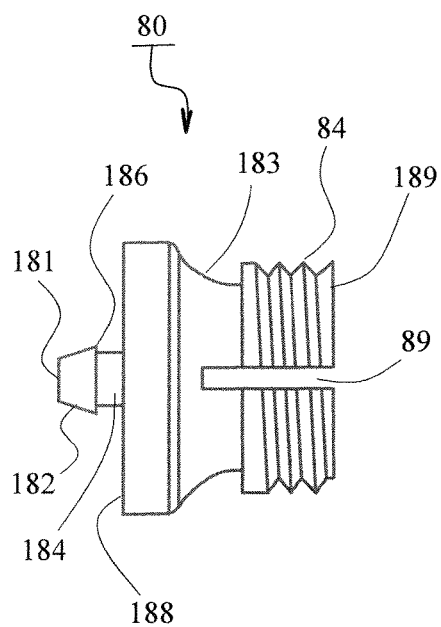
FIG. 9 is a side view of the retaining member.
Figure 9A:
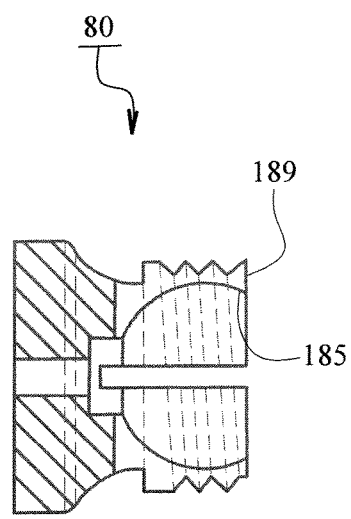
FIG. 9a is a side cross section view of the retaining member.

FIGS. 8-9 depict an example of a retaining member 80. A first end 181 of the retaining member 80 is adapted to attach to the rear surface 40 of the display device 10. The retaining member 80 is provided to secure an interchangeable mating attachment 170 to the display device 10 that is adapted to fasten various items to the display device 10, such as a mobile device holder, deodorizer or fragrance, sunglasses, or the like.

As shown in FIG. 9, the retaining member 80 has a plug 182 extending from a neck 184. The plug 182 is wider than the neck 184 defining a shoulder 186. When installed (similar to FIG. 19), the plug 182 is pressed through an aperture 187 in a wall 41 in the rear surface 40 of the display device 10 until the shoulder 184 has completely passed through the rear wall 40 and the shoulder 186 is secured to an inner surface 40*c* of a rear side of the wall 41 of the rear surface 40.

Figure 10:
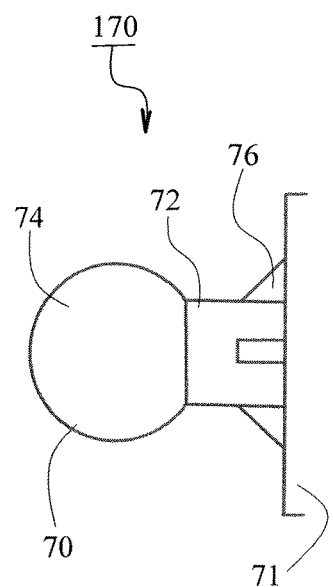
FIG. 10 is a side view of the mating interchangeable attachment.

Referring back to FIGS. 9 and 9a, a second end 183 of the retaining member 80 is a female component adapted to receive a male end of another attachment such as the interchangeable mating attachment 170 (FIG. 10). As shown in FIGS. 8, 9a and 11-13 from the second end 189 of the retaining member 80, a concave internal recess 185 is formed within an inner surface of the retaining member 80. The concave internal recess 185 contains an inward rounded internal shape adapted to receive, mate with and securely retain the interchangeable mating attachment 170.

FIG. 10 depicts one embodiment for another mating attachment 170. The mating attachment 170 includes a post 72 connected to a projection 70 having an outer surface with rounded end 74. The rounded end 74 of the projection 70 fits within a concave internal recess 185 of the retaining member 80 that is adapted to receive the rounded end 74 of the projection 70.

The projection 70 may include ribs 76 disposed adjacent to and around the post 72 at the base 77 of the projection 70 to provide enhanced structural rigidity to the projection 70. The base 77 of the post 72 may be a flat base plate or other shape, which in turn may be permanently integrated and/or fastened to another unit that is to be attached as the interchangeable mating attachment 170.

FIGS. 15-16 depict the interchangeable mating attachment 170 integrated into a mobile device holder 190 or the like. The mobile device holder 190 includes a projection 70 disposed within the retaining member 80 and secured by a fastener 140. The post 72 is attached to a base 77. The base 77 is a platform upon which a mobile device may be secured.

The mobile device holder 190 includes a pair of jaws 194, 195 adapted to clench or grasp the mobile device and secure it firmly to the base 77. In this construction, a mobile device can be conveniently secured to the display device 10 and used in a handsfree manner in a vehicle. The display device 10 can be embedded with a power source and an input that can be used to recharge the mobile device when it is attached or contemporaneously in the vicinity of the display device 10.

Figure 21:
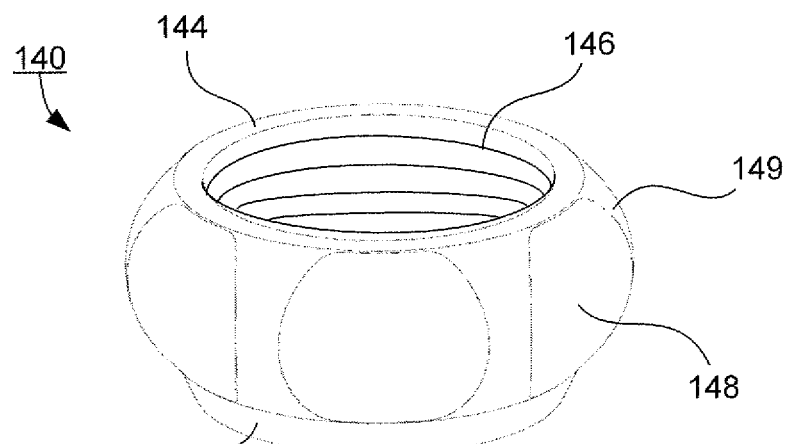
FIGS. 21-22 are upper and lower perspective views of the fastener.
Figure 23:
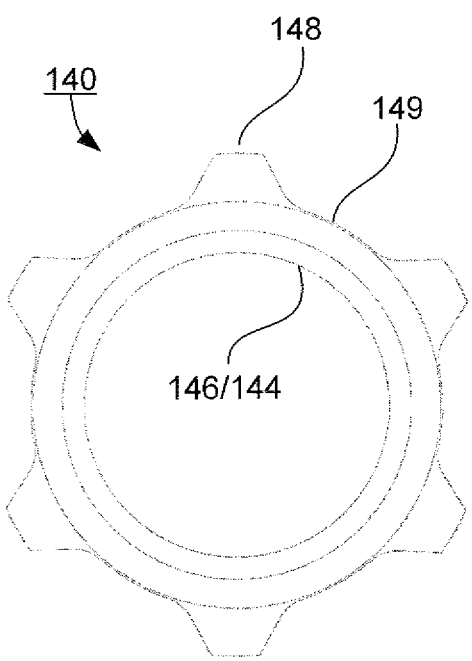
FIG. 23 is a front view of the fastener.
Figure 22:
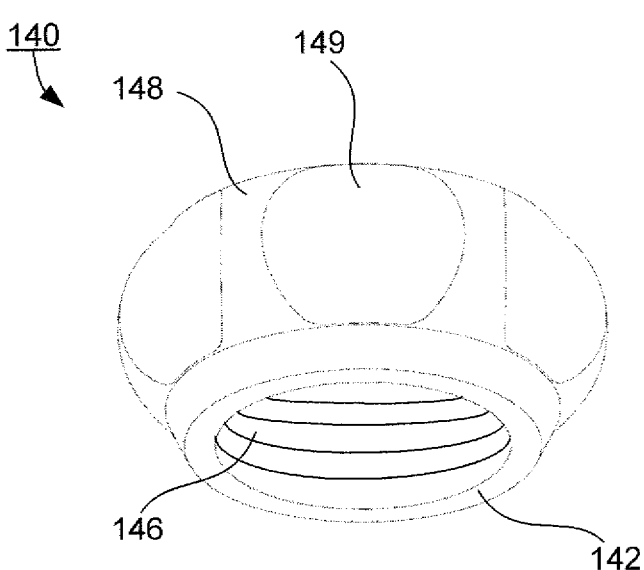

FIGS. 21-22 depict the fastener 140 in a variety of different views. As shown, the fastener 140 is depicted as a nut-type fastener that includes various threads 144 disposed on an inner surface 146 of the fastener 140. The fastener 140 may include a plurality of protruding webs 148 extending from an outer surface 149 of the cylindrical fastener 140. The webs 148 are provided to allow a user to conveniently grip onto the outer surface 149 of the assembly 140.

In use, and as shown in FIGS. 15-16 and 21-23, the fastener 140 is placed over the round end 74 of the projection 70 and the second end 183 of the retaining member 80. That is, the rounded end 74 of the projection 70 is inserted into a first end 142 of the fastener 140 and the retaining member 80 is inserted into a second end 144 of the fastener 140 until the round end 74 of the projection 70 is inserted into the concave internal recess 185 of the retaining member 80. In particular, as shown in FIG. 16, the rounded end 74 of the projection 70 is slip fit into the second end 183 of retaining member 80 until the rounded end 70 is located within the concave internal recess 185 of the retaining member 80. The internal threads 144 of the fastener 140 are threadedly fastened to the external threads 84 of the retaining member 80.

As the fastener 40 is tightened over the external threads 84 of the retaining member 80, the outer split ends 89 of the retaining member 80 provided at the second end 183 are flexibly compressed onto the rounded end 74 of the projection 70. As the fastener 140 is threadedly tightened onto the external threads 84 on the retaining member 80, the rounded end 74 of the projection 70 is pulled deeper into the concave inner internal recess 185 of the retaining member 80 until it is locked tightly within the internal recess 82 of the retaining member 80.

The fastener 140 may be selected from any number of fastening mechanisms, including but not limited to, a screw, a universal joint, a releasable locking pin, a ratchet and teeth mechanism, a pivot, a telescopic extension, a swivel, a universal joint, and/or any other suitable fastening mechanism desired for optimal positioning of the interchangeable mating attachment 170 relative to the display device 10.

Figure 18:
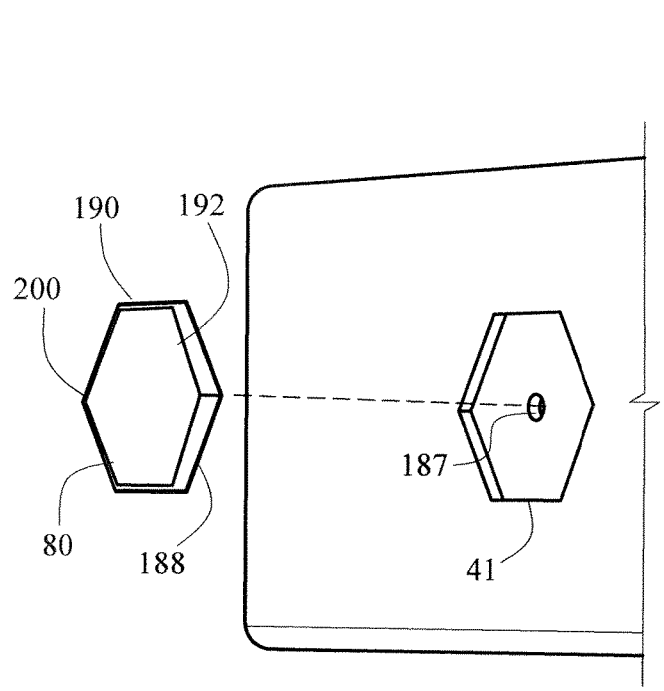
FIG. 18 is a rear perspective view of a base of the retaining member adapted to fit within a recess disposed in a rear surface of the display device.
Figure 19:
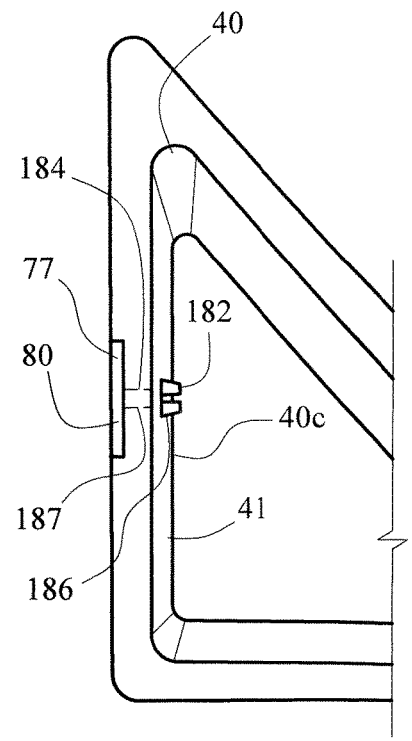
FIG. 19 is a side view of the base of the retaining member adapted to fit within a recess and across a wall of the display device.
Figure 20:
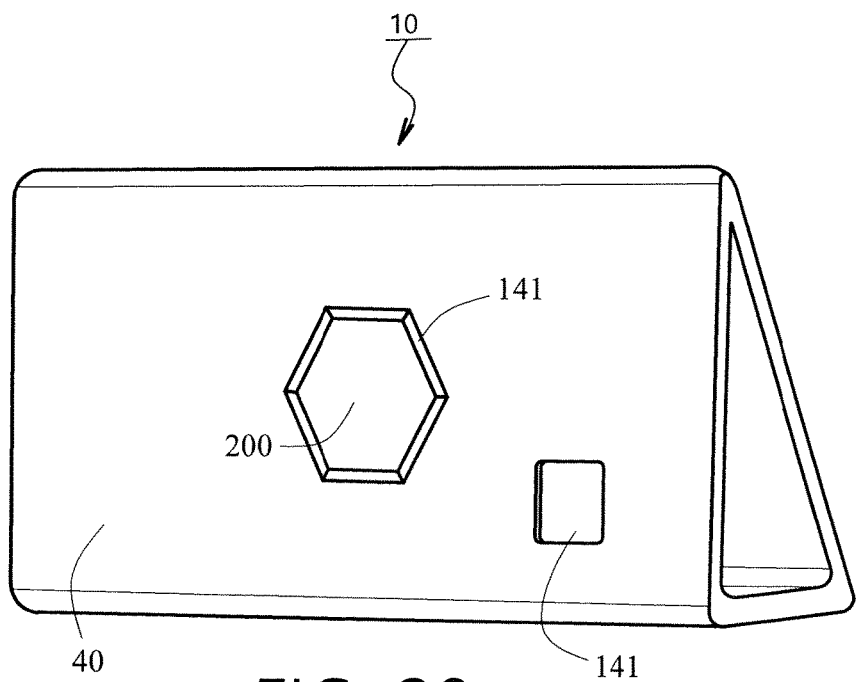
FIG. 20 is a rear perspective view of the base of the retaining member attached to the recess in a rear wall of the display device.

FIGS. 18-20 further demonstrates an alternate method for securing the retaining member 80 to the rear surface 40 of the display device 10. In FIG. 18, the base 188 of the retaining member 80 is configured with a particular predetermined shape. As shown in FIGS. 18-20, the base 188 is configured as a hexagon. The rear surface 40 of the display device 10 has a mating recess 41 adapted to receive the base 188 in a secure manner to prevent the rotation of the base 188 when it is attached to the mating recess 41 in the rear surface 40.

Similar to FIG. 9, FIG. 19 shows the retaining member 80 has a plug 182 extending from a neck 184 attached to the base 188. The plug 182 is a split end plug that is adapted to flex inward. The plug 182 is wider than the neck 184 defining a shoulder 186. As shown in FIGS. 19 and 20, when installed, the plug 182 is pressed through an aperture 187 in the rear surface 40 wall of the display device 10 until the shoulder 184 has completely passed through the rear wall 41 and the shoulder 186 is secured to an inner surface 40c of a rear side of the rear wall 41.

The base 188 of the retaining member 80 may be configured to receive an air freshener or a deodorizer 200. The deodorizer 200 may be constructed as a solid scented substance 192 that is disposed within the base 188 such as shown in FIG. 18. Alternatively, the base 188 of the retaining member 80 can also be constructed to be the base for the retaining member 80. As shown in FIGS. 15-17, the base 188 of the retaining member 80 has a hexagonal shape and is secured into a recess 41 by its base 188 to the rear wall 41 of the display device 10. This configuration yields a strong attachment that will prevent the base 188 from rotating providing a more secure connection with the rear surface 40.

FIG. 20 illustrates another recess 141 disposed in the rear surface 40 of the display device 10. Similar to FIG. 18, the recess 141 may be constructed with an aperture to receive a plug and a post such as described in FIG. 9, or alternatively, the recess may be adapted to receive the base of another retaining member.

Figure 11:
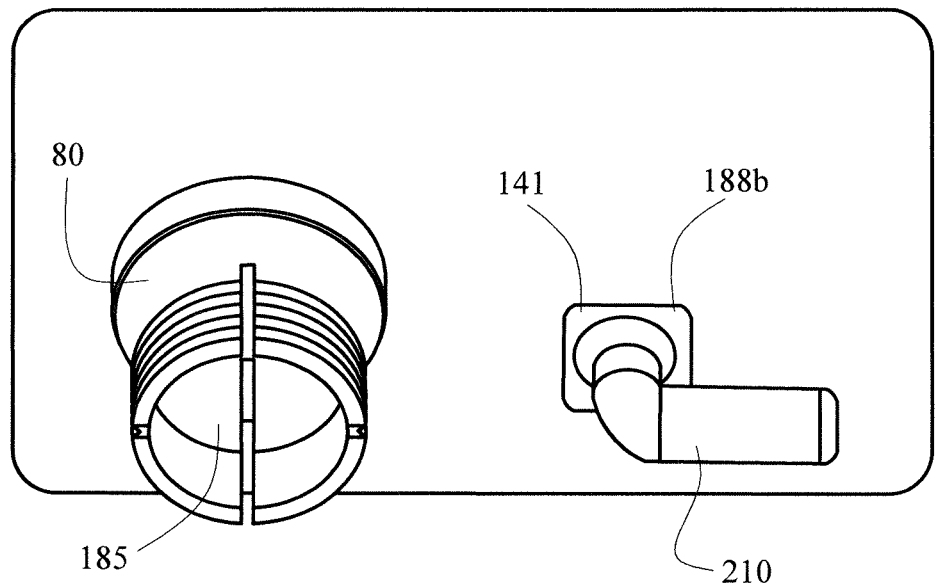
FIG. 11 is a rear perspective view of the retaining member and the second retaining member.
Figure 13:
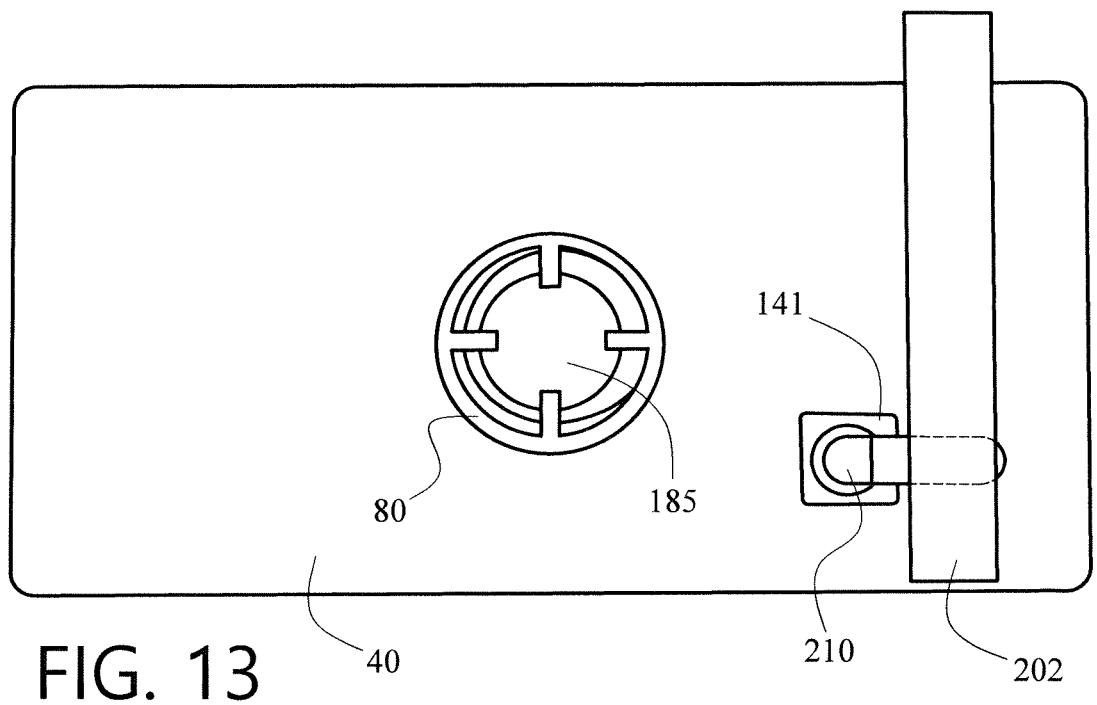
FIG. 13 is a rear view of the retaining member and the second retaining member securing a deodorizing element.
Figure 14:
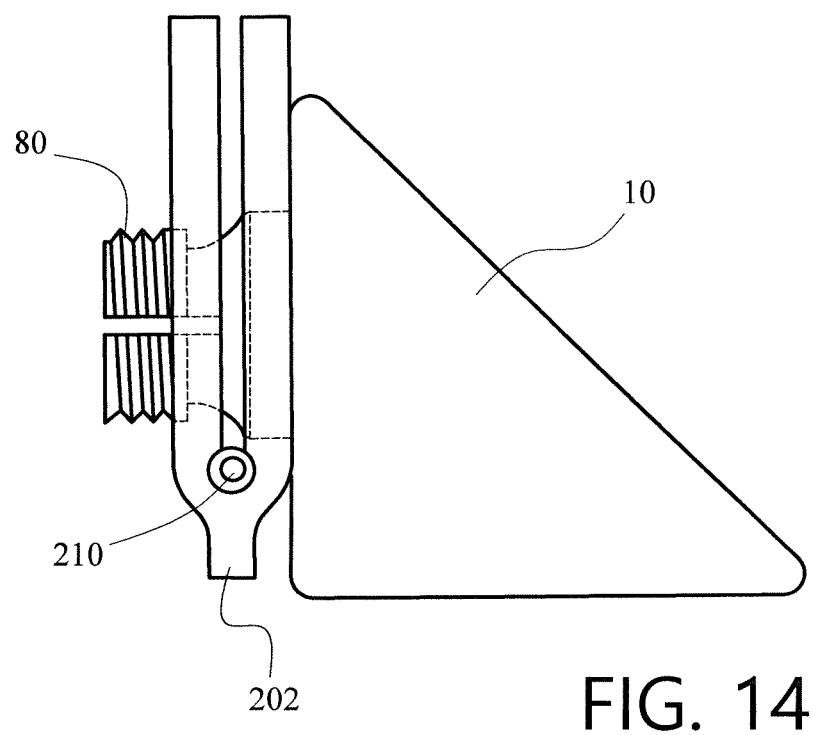
FIG. 14 is a side view of the retaining member and the second retaining member securing a deodorizing element.

More specifically, FIG. 11 shows a base 188b for a post retainer 210 adapted to be secured to the recess 141 in the rear surface 40 of the display device 10. In use, the base 188b may be attached to the recess 141 via an adhesive or other type of suitable attachment method for securing thereto. The base 188b may be secured to a post retainer 210. The post retainer 210 extends from the base 188b and may hook to one side. As shown in FIGS. 12-14, a deodorizer 200 may be attached as to the post retainer 210. The deodorizer 200 is embodied as a wishbone deodorizer member 202.

The wishbone deodorizer member 202 includes a pair of legs open at a first end and closed at a second end. A gap is provided between the lags into which the post retainer 210 is located and secured therein. The wishbone deodorizer member 202 can be easily removed and replaced when the deodorizer requires replacing. Although, a mobile device holder and a wishbone deodorizer member 202 are shown attached to the rear surface 40 of the display device 10, it is to be understood that various other items may be secured to the various faces of the display device according to this subject disclosure.

Figure 24:
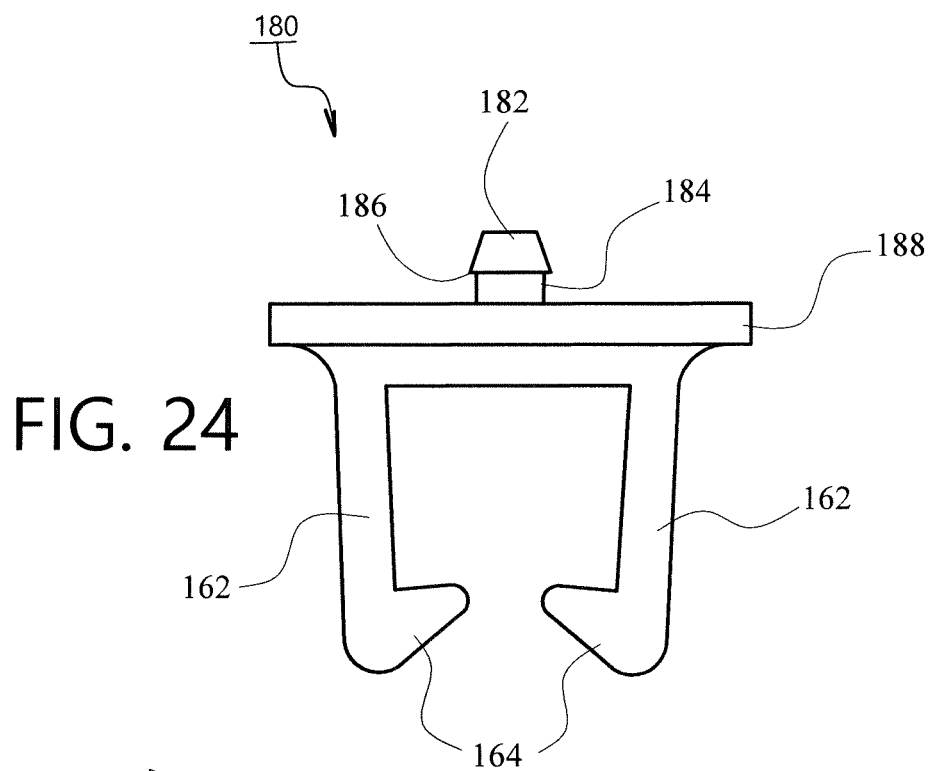
FIG. 24 is a side view of a second retainer.

FIG. 24 shows another embodiment for a claw retainer 180. The claw retainer 180 includes a plug 182 extending from a neck 184 attached to the base 188. The plug 182 may also have a split end that is adapted to flex inward when pressed through the rear wall 41. As shown, the plug 182 is wider than the neck 184 also defining a shoulder 186 and when installed, the plug 182 is pressed through an aperture in the rear surface 40 wall of the display device 10 until the shoulder 184 has completely passed through the rear wall 41 and the shoulder 186 is secured to an inner surface 40c of a rear side of the rear wall 41.

Figure 25:
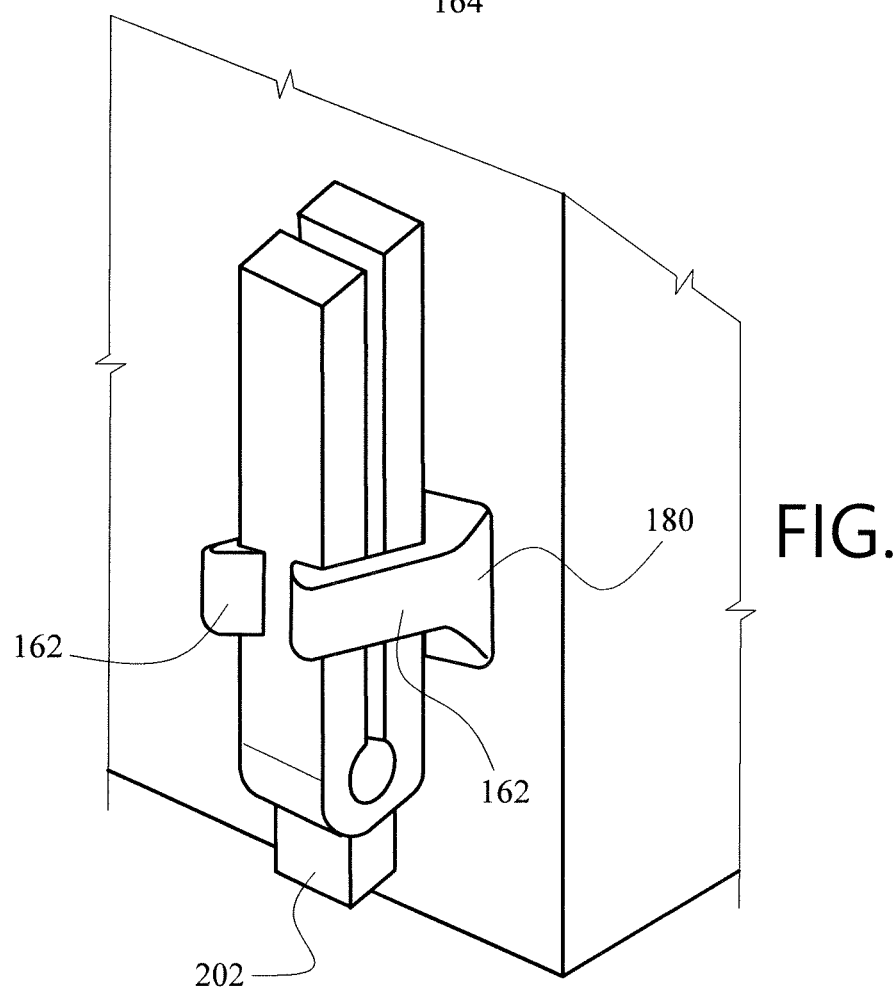
FIG. 25 is a partial perspective view of the second retainer securing a deodorant air freshener.

As shown in FIG. 25, the claw retainer 180 includes a pair of claws 162 that are biased inward to each adapted to receive the wishbone deodorant member 202. The wishbone deodorant member 202 can be wedged in between the claws 162 via a friction fit. The claws 162 have inward facing hooks 164. When the wishbone deodorant member 202 is in need of replacement, the claws 162 may be flexed outward to release the wishbone deodorant member 202.

It will be recognized by those skilled in the art that changes or modifications may be made to the above described embodiment without departing from the broad inventive concepts of the invention. It is understood therefore that the invention is not limited to the particular embodiment which is described, but is intended to cover all modifications and changes within the scope and spirit of the invention.

What is claimed:

1. A display device comprising:
   a wedge body that is substantially a triangular prism having a front panel surface, a lower panel surface that supports the wedge body, a rear panel surface and two side surfaces, the front panel surface and the lower panel surface of the wedge body being adapted to fit substantially flush within a corner between a windshield and a dashboard or rear deck of a vehicle;
   indicia attached to, and displayed on an outer surface of at least one of the surfaces; and
   a retaining member attached to the rear panel surface,
   wherein the lower panel surface has a friction grip that prevents slippage of the display device from occurring, and
   wherein at least one of the surfaces has a recess into which a base of the retaining member may be secured.

2. The display device recited in claim 1, wherein the retaining element is secured to a mating element comprised of: at least one of an air deodorizer, and a mobile device holder.

3. The display device recited in claim 1, wherein the recess has a first shape and the base has a second shape that is similar and mates with the first shape of the recess.

4. The display device recited in claim 1, wherein the retaining member has a base at a first end, the base is connected to a projection with a plug disposed at the end of a post, wherein the projection is inserted into an aperture in at least one of the surfaces such that the plug extends through a wall and captivated by a rear surface of the wall via a shoulder configured between the plug and the post that has a smaller thickness then the plug.

5. The display device recited in claim 4, wherein the retaining element has a second end with an internal recess into which a second projection from the mating element is adapted to fit within the internal recess, and a fastener that secures the second projection into the internal recess.

6. The display device recited in claim 1, further comprising a second recess on at least one surface adapted to receive a third base of a second retaining member, wherein a post retainer is secured to the third base, the post retainer extends from the third base and is adapted to be secured to a deodorizer.

7. The display device recited in claim 1, wherein the display device has a door opening into an internal storage compartment.

8. The display device recited in claim 7, wherein the internal storage compartment is adapted to house an electronic access element.

9. The display device recited in claim 1, wherein the display device includes an illumination source.

10. The display device recited in claim 1, wherein the display device has a power source to recharge one or more mobile devices.

11. A display device comprising:
    a wedge body that is substantially a triangular prism having a front panel surface, a lower panel surface that supports the wedge body, a rear panel surface and two side surfaces, the wedge body being adapted to fit substantially flush within a corner between a windshield and a dashboard or rear deck of a vehicle;
    indicia attached to, and displayed on an outer surface of at least one of the surfaces, and
    a retaining member attached to the rear panel surface of the wedge body adapted to secure a mating element that secures a communication device,
    wherein the lower panel surface has a surface contour that prevents slippage of the display device via a friction fit, and
    wherein at least one of the surfaces has a recess into which a base of the retaining member may be secured.

12. A display device comprising:
    a wedge body that is substantially a triangular prism having a front panel surface, a lower panel surface that supports the wedge body, a rear panel surface and two side surfaces, the wedge body being adapted to fit substantially flush within a corner between a windshield and a dashboard or rear deck of a vehicle secured via a friction fit;
    indicia attached to, and displayed on an outer surface of a front surface, and
    a retaining member attached to the rear panel surface of the wedge body adapted to secure a mating element, the retaining member having a projection disposed at a first end comprising:
      a base;
      a post connected to the base; and
      a plug disposed at the end of the post defining a shoulder between the post and the plug, wherein the projection is inserted into an aperture in a wall in at least one of the surfaces such that the plug extends through the aperture and is captivated by the shoulder on an internal surface of the wall.

13. The display device recited in claim 12, wherein the wedge body has an internal compartment.

14. The display device recited in claim 12, further comprising:
    an interchangeable mating element having a second projection adapted to fit within an internal recess in the retaining member; and a fastener that removably attaches the interchangeable mating element to the retaining element by securing the second projection into the internal recess.

\* \* \* \* \*